Oct. 23, 1923.

J. A. MOXEY 1,471,346

ADJUSTABLE REACH BAR

Filed Sept. 7, 1920

Inventor:-
James A. Moxey,
By H.P. Dudick
Atty.

Patented Oct. 23, 1923.

1,471,346

UNITED STATES PATENT OFFICE.

JAMES A. MOXEY, OF CHICAGO, ILLINOIS, ASSIGNOR TO INTERNATIONAL HARVESTER COMPANY, A CORPORATION OF NEW JERSEY.

ADJUSTABLE REACH BAR.

Application filed September 7, 1920. Serial No. 408,664.

*To all whom it may concern:*

Be it known that I, JAMES A. MOXEY, a citizen of the United States, residing at Chicago, in the county of Cook and State of Illinois, have invented certain new and useful Improvements in Adjustable Reach Bars, of which the following is a full, clear, and exact specification.

This invention relates to wagon running gears and more particularly to improvements in the reach bar.

The most common and least expensive form of reach bar is the square or rectangular wooden reach and while this form is satisfactory in localities where the roads are level and in good condition it has not proved satisfactory when the wagon is used on rough roads. When the wagon is traveling over rough roads and one of the wheels drops into a rut, the wagon body becomes twisted and causes severe torsional strain on the reach bar, which frequently causes the reach to break as well as to create hard pulling on the part of the team.

To overcome this difficulty round reach bars have been adopted in some cases, but are not entirely satisfactory because of the increased expense in their manufacture.

The present invention was devised to overcome the above noted difficulties and has for one of its objects to provide a square or rectangular reach bar that will have all the advantages of a round reach bar and be inexpensive to manufacture.

A further object is to provide a cheap and practicable means for modifying a square reach bar so that it will perform the fuctions of a round reach bar.

One embodiment of my invention is illustrated in the accompanying drawing in which Fig. 1 is a plan view of the running gear of a wagon embodying my improved reach bar.

Figure 1:
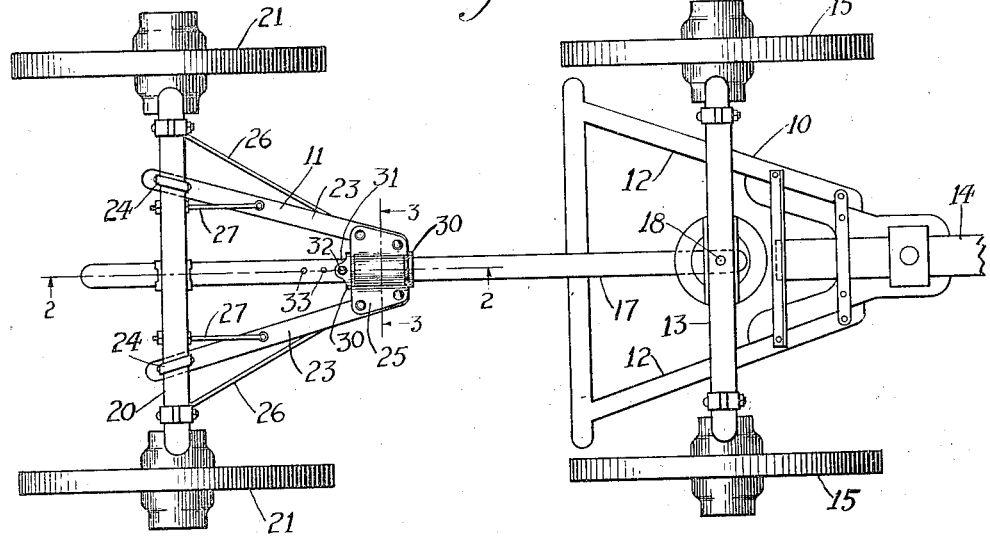
Figure 2:
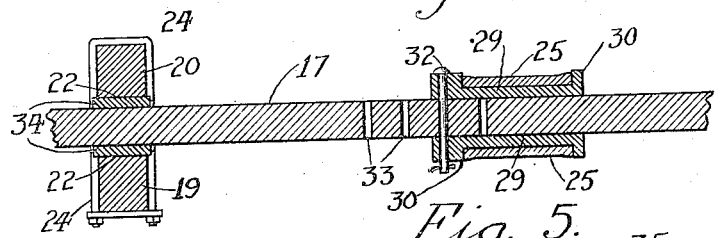
Fig. 2 is a longitudinal section of the rear truck and reach bar taken on the line 2—2, Fig. 1.
Figure 3:
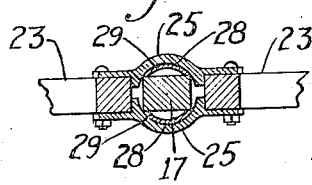
Fig. 3 is a sectional view taken on the line 3—3, Fig. 1.
Figure 4:
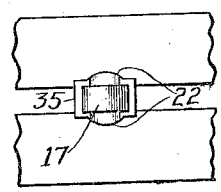
Fig. 4 is an end elevation of the reach bar looking from the left in Fig. 1.
Figure 5:
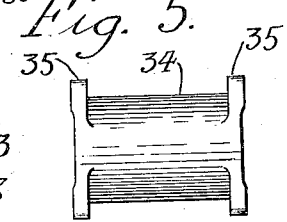
Figs. 5, 6, 7 and 8 are details of the bearing bushings.
Figure 6:
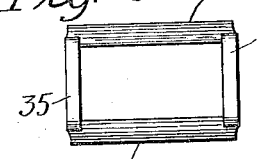
Figure 7:
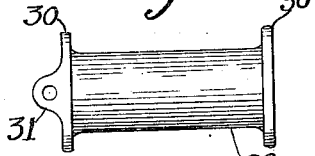
Figure 8:
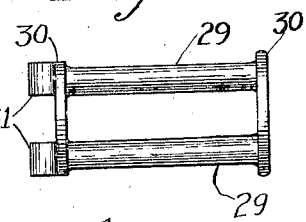

Referring to Fig. 1, 10 indicates the front truck and 11 the rear truck of the wagon. The front truck is provided with the usual hounds 12, bolster 13, tongue 14, and supporting wheels 15. The reach bar 17 is secured in a suitable manner, as by the king bolt 18, to the front truck and extends rearwardly through the rear truck of the wagon. The rear truck is also of standard construction and includes axle 19 and bolster 20. The axle 19 is supported on the usual carrying wheels 21 and the axle and bolster are provided with oppositely disposed substantially semi-circular recesses 22, as best shown in Fig. 4. Hounds 23 are connected at their rear ends by U-bolts 24 to the axle 19 and bolster 20 and are connected at their front ends by hound plates 25. The hounds are also connected to the axle by the tie rods 26 and to the bolster by the tie rods 27. The plates 25 are provided with oppositely disposed semi-circular recesses 28 which coact to provide a cylindrical bearing for the sleeve or bushing 29, as best shown in Fig. 3. The side walls of bushing 29 are cut away to receive the reach bar 17 so that the latter is slidable therethru, as best illustrated in Figs. 3, 7 and 8, and the bushing is provided at each end with a flange 30 to retain it in the bearing in the hound plates. Bosses 31 are provided on one end of the bushing and are perforated to receive a locking pin 32 adapted to be inserted in any one of a plurality of holes 33 in the reach bar, whereby the latter may be adjusted in the bushing.

The recesses 22 in the rear axle and bolster provide a bearing for a bushing or sleeve 34, provided with flanges 35 and cutaway so that the reach bar is slidable therethru, as best shown in Fig. 4.

From the foregoing it will be apparent that I have provided a reach bar rotatably supported in bearing members carried by the hound plates and rear axle and bolster which permit relative rotation between the reach bar and rear axle when the wagon is passing over rough roads, and that I have thereby attained all of the advantages of the round reach bar combined with the cheapness of manufacture of the square reach. It is also to be noted that the reach bar is adjustable in the bearings and is adapted to be secured to one of the bearing sleeves which is retained in its bearings by the flanges provided thereon.

While I have shown and described but one embodiment of my invention, it will be apparent to those skilled in the art that the construction may be modified in various ways without departing from the spirit and scope of my invention as defined by the following claims.

What I claim as my invention and desire to secure by Letters Patent is:

1. In a running gear for wagons, the combination of an axle, a bolster, a bearing formed between the axle and bolster, hounds secured at their rear ends to the axle and bolster, hound plates providing a cylindrical bearing secured to the forward ends of the hounds, a sleeve journaled in the hound plate bearing and having a flange at each end adapted to bear on the ends of the hound plates, the sleeve having opposite perforations in one end beyond the plates, a reach bar slidable in the sleeve and rear bearing, and means extending through the reach bar and the perforations in the sleeve for adjustably securing the reach bar to the sleeve.

2. In a running gear for wagons, the combination of an axle, a bolster, a flanged sleeve journaled between the axle and bolster, hounds secured at their rear ends to the axle, plates secured to the forward ends of the hounds, a flanged sleeve journaled between the plates, the flanges extending there-beyond at each end, oppositely disposed lugs projecting beyond the flange at one end of the sleeve, a reach bar slidable longitudinally in the sleeves and means extending through the lugs and reach bar for adjustably securing the bar with respect to the sleeves.

In testimony whereof I affix my signature.

JAMES A. MOXEY.